United States Patent [19]

Linden

[11] 4,331,782

[45] May 25, 1982

[54] HYDROXYBENZOIC ACID-EPOXY ADDUCT CAPPING AGENTS FOR POLYESTER RESINS

[75] Inventor: Gary L. Linden, Upper Arlington, Ohio

[73] Assignee: Ashland Oil, Inc., Dublin, Ohio

[21] Appl. No.: 240,984

[22] Filed: Mar. 5, 1981

[51] Int. Cl.$^3$ .................... C08G 63/20; C08G 63/46; C08G 18/42

[52] U.S. Cl. .................... 525/173; 525/174; 525/176; 528/53; 528/73; 528/83; 528/100; 528/195

[58] Field of Search .................. 260/18 EP; 525/173, 525/174, 176; 528/100, 195, 53, 73, 83

[56] References Cited

U.S. PATENT DOCUMENTS

| | | | |
|---|---|---|---|
| 3,409,579 | 11/1968 | Robins et al. | 260/30.4 |
| 3,429,848 | 2/1969 | Robins | 260/38 |
| 3,676,392 | 7/1972 | Robins | 260/38 |
| 3,789,044 | 1/1974 | Taft et al. | 260/18 TN |
| 3,804,805 | 4/1974 | Kuhfuss et al. | 528/195 X |
| 3,822,226 | 7/1974 | Taft et al. | 260/18 TN |
| 3,836,491 | 9/1974 | Taft et al. | 260/22 TN |
| 3,890,256 | 6/1975 | McFarlane et al. | 528/195 X |

FOREIGN PATENT DOCUMENTS 1369351 10/1974 United Kingdom.

Primary Examiner—Earl A. Nielsen
Attorney, Agent, or Firm—Mueller and Smith

[57] ABSTRACT

The present invention is an improvement in a method for making a phenol-functional polyester polymer wherein a hydroxybenzoic acid, a polyol, and a dicarboxylic acid are subjected to a polyesterification reaction under polyesterification conditions to make said polymer. The improvement comprises conducting the reaction in two stages, the first stage comprising the formation of an ester-alcohol adduct between said hydroxybenzoic acid and an epoxy compound wherein the ratio of carboxyl groups from said hydroxybenzoic acid to said oxirane groups of said epoxy compound is about 1:1. The second stage of the improvement comprises conducting the polyesterification reaction with said adduct.

19 Claims, No Drawings

HYDROXYBENZOIC ACID-EPOXY ADDUCT CAPPING AGENTS FOR POLYESTER RESINS

BACKGROUND OF THE INVENTION

The present invention relates to polyester resins especially useful in vapor permeation curable coatings and more particularly to an improved synthesis route for making phenol-functional polyester resins.

Vaper Permeation Cure (VPC) is a method for curing polyhydroxy polymers with a multi-isocyanate curing agent by exposure thereof to a vaporous tertiary amine catalyst at room temperature. VPC characteristics include extremely rapid cure times often ranging from as low as about 15 to 30 seconds and the ability to effect complete polymer cure at room temperature. Exemplary uses of VPC which take advantage of these properties include the curing of foundry binder compositions (U.S. Pat. No. 3,409,579) where the speed of cure is important and in coating heat-sensitive substrates such as thermoplastic substrates (commonly assigned application of Blegen, U.S. Ser. No. 216,323, filed on Dec. 15, 1980). Of course, other particular adaptations of VPC technology exist as will be readily apparent to those skilled in the art.

A typical VPC coating composition comprises a polyol in admixture with a multi-isocyanate curing agent. Aromatic hydroxyl-functional resins are preferred for this purpose. For example, U.S. Pat. No. 3,789,044 proposes a VPC curable coating composition wherein the resin is made by reaction of hydroxybenzoic acid with an epoxy resin. The phenol-functional reaction product then is admixed with the multiisocyanate and cured by exposure to a vaporous tertiary amine catalyst. U.S. Pat. No. 3,836,491 proposes to cap a polyester resin with a hydroxybenzoic acid which phenol-functional polyester is admixed with a multi-isocyanate curing agent and cured according to VPC techniques. With regard to the former patent, unfortunately the residual aliphatic hydroxyl groups from the oxirane rings in the epoxy resin diminish the pot life of the coating composition and retard the time to ultimate cure which is experienced when VPC cure is practiced. As to the latter proposal, it has been discovered that hydroxybenzoic acids are subject to decarboxylation when used in an attempt to form the phenol-functional polyester at typical polyesterification temperatures of greater than about 200° C., e.g., typically about 235° C. Thus, as regards hydroxybenzoic acid-capped polymers for use in VPC coatings, there exists a need in the art for overcoming the foregoing shortcomings of prior proposals.

BROAD STATEMENT OF THE INVENTION

The present invention is an improvement in a method for making a phenolfunctional polyester polymer wherein a hydroxybenzoic acid, a dibasic acid, and a polyol are subjected to a polyesterification reaction under polyesterification conditions to make said polymer. Such improvement comprises conducting the reaction in two stages. The first stage comprises forming an ester-alcohol adduct between said hydroxybenzoic acid and a monoepoxide. The second stage then comprises conducting the polyesterification reaction with said adduct and the remaining ingredients used to make the polyester polymer. The resulting polyester polymer is substantially free of residual reactive aliphatic hydroxyl groups and is ideally suited to be admixed with a multi-isocyanate curing agent for compounding a VPC coating composition. An applied film of the resulting coating composition comprising said polyester polymer, said curing agent, and a solvent therefor is curable by exposure thereof to a vaporous tertiary amine catalyst.

Advantages of the present invention include the ability to synthesize a phenol-functional polyester polymer utilizing a hydroxybenzoic acid without subjecting such hydroxybenzoic acid to conditions amenable to decarboxylation thereof. A further advantage is that the resulting polyester polymer is substantially free of residual reactive aliphatic hydroxyl groups for providing superior pot life of a coating composition comprising said polyester polymer, said curing agent, and a solvent therefor. These and other advantages will become readily apparent to those skilled in the art based upon the disclosure contained herein.

DETAILED DESCRIPTION OF THE INVENTION

Suitable hydroxybenzoic acids for purposes of the present invention include para-hydroxybenzoic acid, meta-hydroxybenzoic acid, and ortho-hydroxybenzoic acid (salicylic acid). Of course, the aromatic ring of the hydroxybenzoic acid optionally may be substituted, e.g. with alkyl substituents or aromatic substituents, though the unsubstituted forms are preferred.

The ester-alcohol adduct is formed between the hydroxybenzoic acid and an epoxy compound. While it is preferred that a mono-epoxide be used in the adduct formation, such epoxy compound can be a polyepoxide providing that the molar ratio of carboxyl groups from the hydroxybenzoic acid to the oxirane groups of the polyepoxide is restricted to be about 1:1, though such ratio can be varied, especially to leave residual epoxide groups for achieving special effects. Also, while terminal oxirane groups in the epoxy compound are preferred, such oxirane groups can be in the backbone of the epoxy compound for formation of the ester-alcohol adduct of the present invention. Accordingly, then, the epoxy compound can be an epoxy monomer, oligomer, or polymer, as is necessary, desirable or convenient. Accordingly, suitable epoxy compounds include the internal epoxide compounds such as epoxidized fatty compounds, various alicyclic epoxides, and terminal epoxides such as glycidyl-containing compounds.

Such epoxidized fatty compounds include epoxidized fatty oils, epoxidized fatty acid esters of monohydric alcohols, epoxidized fatty acid esters of polyhydric alcohols, epoxidized fatty nitriles, epoxidized fatty amides, epoxidized fatty amines, and epoxidized fatty alcohols. Suitable alicyclic epoxide and polyepoxide materials include dicyclopentadiene diepoxide, limonene diepoxide, and the like. Additional useful epoxides include, for example, vinyl cyclohexane dioxide, bis(3,4-epoxycyclohexl) adipate, 3,4-epoxycyclohexylmethyl-3,4-epoxy-cyclohexane carboxylate, and 2-(3,4-epoxycyclohexyl-5,5-spiro-3,4-epoxy) cyclohexane-metadioxane.

Additionally, acrylic copolymers containing copolymerized glycidyl acrylate or meythacrylate units may be used. These acrylic copolymers can be prepared by the reaction of $C_1$-$C_{18}$, more preferably $C_1$-$C_{12}$, esters of alpha,beta-ethylenically unsaturated carboxylic acids with either glycidyl acrylate or methacrylate. These monomers can be copolymerized optionally in the presence of other copolymerizable monomers such as vinyl aromatic compounds, acrylonitrile or methacrylonitrile and the like. These acrylic copolymers are prepared by conventional techniques known in the art whereby the monomers are polymerized in solution or dispersed form in the presence of initiators such as benzoyl peroxide or azo-bis-isobutyronitrile, or the like. Such preformed glycidyl-containing materials, such as the glycidyl-containing acrylates; the alicyclic epoxides; bisphenol-epichlorohydrin adducts; or the epoxidized fatty materials, are subsequently reacted with a hydroxybenzoic acid to form the adduct of the present invention. Representative preferred epoxy compounds suitable for use in formation of the adduct of the present invention include, for example, propylene oxide, ethylene oxide, and like oxides. Cardura E ester (a glycidyl ester of Versatic 911 acid which is a mixture of aliphatic, mostly tertiary, acids with 9-11 carbon atoms, Cardura and Versatic being trademarks of Shell Chemical Company, New York, N.Y.); mono-epoxides of $C_8$-$C_{22}$ mono-olefins and especially α-olefins; and the like and even mixtures thereof may be used also.

The adduct is formed by reacting the hydroxybenzoic acid and the epoxy compound, optionally in a solvent therefor, at a temperature ranging from about 90° to about 120° C. to initiate such reaction. Once the reaction is initiated, such reaction is exothermic, and the reaction temperature can rise to a temperature of about 150° to 175° C. usually without application of external heat. The reaction temperature then is maintained at about 150° to 170° C. (and always less than about 200° C.) until the reaction has been determined to be substantially complete. The resulting adduct then can be used in formation of polymers ideally suited for VPC systems though it must be understood that the adduct can find wide use in formation of polyester polymers (by reaction of the adduct with polyester-forming ingredients such as polyols, polycarboxylic acids, and their equivalents) suitable for use in a wide variety of applications including, for example, adhesives, molding compounds, coating compositions curable by heat or like techniques, and a wide variety of other uses. Of importance, though, is that the resulting ester-alcohol adduct now is stable for use in standard polyesterification reactions where temperatures exceeding 200° C. often are required.

A wide variety of acids and alcohols desirably can be used in synthesizing polyesters for capping by the adduct disclosed herein. Suitable carboxylic acids for this purpose include, for example, $C_2$-$C_{12}$ linear aliphatic dibasic acids; aromatic dicarboxylic acids such as isophthalic, orthophthalic, terephthalic acids and their anhydrides, where the formation of the anhydride is possible; trimellitic anhydride and the like; monocarboxylic acids such as, for example, benzoic acid, paratertiary-butyl benzoic acid, 2-ethyl hexoic acid, fatty acids derived from naturally occurring oils such as tall oil, glyceride oils, and the like; and the like and mixtures thereof. Suitable alcohols useful in polyester synthesis include, for example, glycols such as ethylene glycol, propylene glycol and the like; polyhydric alcohols such as trimethylolpropane, trimethylolethane, pentaerythritol, hexane diol, butane diol, glycerine, hexane triol, and the like in mixtures thereof; sterically hindered diols such as neopentyl glycol, cyclohexane dimethanol, and the like and mixtures thereof. Moreover, additional ingredients include propylene oxide, ethylene oxide, and the like; epoxide-containing materials such as epoxidized fatty compounds; acrylic copolymers containing copolymerized glycidyl acrylate and methacrylate units; and the like and mixtures thereof. It will be appreciated that the foregoing list is merely representative of the wide variety of ingredients (even containing different functionality for reaction with the adduct, e.g. isocyanate) which can be used in the present invention.

Prime uses of the ester-alcohol adduct of the present invention include VPC coatings technology, as noted above. One preferred VPC coating's use is in the formation of a phenol-functional polymer which contains ethylenic unsaturation and wherein the phenol functionality is derived from the adduct of the present invention. Such unsaturated polymer is admixed with an ethylenically unsaturated diluent which is addition polymerizable with the ethylenic unsaturation of the polymer and optionally fugitive organic solvent. Such ingredients are admixed with a multi-isocyanate curing agent and can be cured by exposure to a vaporous tertiary amine catalyst wherein additional catalysts, e.g., peroxides, in the composition catalyze the addition polymerization reaction. Additionally, the adduct may be useful in forming a phenol-functional ethylenically unsaturated polymer which is cured with the multi-isocyanate curing agent in the presence of a vaporous tertiary amine, wherein the ethylenic unsaturation in the polymer is self-cross-linking. Further, the adduct may be useful in forming phenol-functional polymers which in admixture with multi-isocyanate curing agents dispersed in a fugitive organic solvent or an aqueous solvent have been determined to be extremely valuable in coating surface-porous substrates, as disclosed in commonly assigned application of Blegen et al., U.S. Ser. No. 270,896, filed on June 5, 1981 the disclosure of which is expressly incorporated herein by reference. Such coatings system solves a problem which plagues this commerical art in that conventional heat-cured coatings suffer from extreme surface imperfections which trap air and/or solvent in such porosity of the coated substrate. Heat curing of the coating causes these entrapped components to be expelled during such heat-curing operations, thus causing a coated surface replete in pits and other surface imperfections. The rapid room temperature cure achieved via VPC techniques produces a coating which does not suffer from such pinholing surface imperfections. Additionally, such disclosure additionally notes that adhesion, for example, can be improved by the addition of inert fillers to the coating composition.

Yet another use for the adduct of the present invention is in the formation of VPC polyester coating compositions specially formulated for flexible substrates as disclosed by Blegen in commonly assigned U.S. Ser. No. 216,323 filed on Dec. 15, 1980, the disclosure of which is expressly incorporated herein by reference. Such disclosure provides a particularly adapted polyester resin which in combination with the multi-isocyanate curing agent and a unique mar-resisting agent of an organic compound physically incompatible in the coating composition and having an effective chain length of at least about 12 carbon atoms, provides an unusually mar-resistant and flexible coating ideally intended for flexible substrates such as flexible vinyl substrates.

With appropriate modification, the adduct of the present invention also can be useful in forming coating compositions as disclosed in U.S. Pat. Nos. 3,789,044, 3,822,226, and 3,836,491. Such patents disclose vapor permeation curable coating compositions wherein the phenol functionality is derived from a hydroxybenzoic acid. Thus, the basic resins disclosed therein are hydroxy-functional prior to the addition of the hydroxybenzoic capping agent. Accordingly, such resins only need be rendered carboxyl-functional either by separate addition of a dicarboxylic acid or the like to the resin mix or increasing the proportion of such acid in the mix in order to provide a carboxyl-functional resin suitable for capping with the adduct of the present invention. Implementation of this clearly is readily apparent to those skilled in this art.

A variety of additional uses can be contemplated for the adduct of the present invention as those skilled in this art will fully appreciate.

Of importance in resin design in the present invention is that the phenol-functional compound be substantially free of reactive aliphatic hydroxyl groups. Aliphatic hydroxyl groups diminish the pot life of the coating composition as well as are slower to cure with the isocyanate curing agent in the presence of the catalyst. Thus, any aliphatic hydroxyl groups on the phenol-functional compound should be sufficiently shielded (sterically hindered) so that they are substantially unreactive or non-participatory in the isocyanate curing reaction.

Multi-isocyanate cross-linking agents cross link with the aromatic hydroxyl groups of the resulting adduct-capped polymer under the influence of a vaporous tertiary amine to form urethane linkages and to cure the coating. Aromatic isocyanates are necessary in order to obtain the desired rapid reaction in the presence of the vaporous tertiary amine catalysts at room temperature. For high performance coatings, initial color as well as the discoloration due to sunlight can be minimized by including at least a moderate level of aliphatic isocyanate content in the curing agent. Of course, polymeric isocyanates are employed in order to reduce toxic vapors of isocyanate monomers. Further, alcohol-modified and other modified isocyanate compositions find utility in the invention. Multi-isocynates preferably will have from about 2–4 isocyanate groups for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p- phenylene diisocyanates, bitolylene diisocyanate, triphenylmethane triisocyanate, tris-(4-isocyanatophenyl) thiophosphate, cyclohexane diisocyanate (CHDI), bis-(isocyanatomethyl) cyclohexane ($H_6$XDI), dicyclohexylmethane diisocyanate ($H_{12}$MDI), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene and xylene diisocyanate and methyl derivatives thereof, polymethylene polyphenyl isocyanates, chlorophenylene-2,4-diisocyanate, and the like and mixtures thereof. Aromatic and aliphatic poly-isocyanate dimers, trimers, oligomers, polymers (including biuret and isocyanurate derivatives), and isocyanate functional prepolymers often are available as preformed packages and such packages are suitable for use in the present invention also.

The ratio of aromatic hydroxyl equivalents from the phenol-funtional compound to the isocyanate equivalents of the multi-isocyanate cross-linking agent should be greater than 1:1 and can range on up to about 1:2. The precise intended application of the coating composition often will dictate this ratio or isocyanate index. At high cross-linking densities or isocyanate equivalents, harder but relatively inflexible films are produced while at lower cross-linking densities or isocyanate equivalents flexibility of the films increases. Optimizing the particular property or combination of properties desired can be determined as those skilled in this art will appreciate.

Usually a solvent or vehicle for the coating composition will be required and advantageously such solvent is a volatile organic solvent. Typical solvents include, for example, methyl ethyl ketone, acetone, methyl isobutyl ketone, ethylene glycol monoethyl ether acetate, xylene, toluene, and the like, and often mixtures thereof. The proportion of solvent, and hence the non-volatile solids content of the coating composition, depends upon factors including method of application, desired application viscosity, and the like factors.

A variety of additives can be included in the coating composition. The coating composition can contain opacifying pigments and inert extenders such as, for example, titanium dioxide, zinc oxide, clays such as kaolinite clays, silica, talc, and the like. Additionally, the coating composition can contain corrosion inhibiting pigments, plasticizers, flow leveling agents, surfactants, tinctorial pigments, and a wide variety of conventional coating additives. The finally compounded coating composition (phenol-functional resin, curing agent, solvent, and optional additives) possesses an excellent pot life of at least 4 hours in an open pot and often on up to 8–18 hours or longer.

The coating composition of the present invention can be cured in the presence of a tertiary amine such as, for example, triethyl amine, dimethyl ethyl amine, cyclohexyl dimethyl amine, methyl diethyl amine, and the like, by exposure thereto for times ranging from as short as 5 seconds on up to 30 seconds or longer (e.g. about 2 minutes). The coating composition thus cured may be immediately handled without fear of deleterious tackiness or blocking of the cured film.

In practicing the present invention, the coating composition is applied to the substrate by direct roll coat or curtain coating with or without knife, reverse roller coat, atomized application, or like conventional technique. Use of a two-head spray equipment is unnecesary since the coating composition of the present invention possesses such an excellent pot life. After the film is applied to the substrate, the coated substrate is passed through a zone or region which contains the vaporous tertiary amine. Representative vapor curing chambers for vapor curing the coating include those shown in U.S. Pat. Nos. 3,851,402 and 3,931,684, the disclosures of which are expressly incorporated herein by reference. The vaporous tertiary amine often is admixed with a carrier gas, such as an inert gas like nitrogen or carbon dioxide, in order to facilitate its dispersion in the curing chamber as well as for minimizing the chance of explosion. The saturated atmosphere in the curing chamber normally will contain the vaporous tertiary amine in a proportion of between about 2% and 12% with catalyst concentrations somewhere in the range of 4–8% being preferred. Room temperature may be maintained during the entire sequence of operations from coating, to curing of the coated substrate. An advantage of room temperature curing of the coating is that application to thermoplastic subtrates which are sensitive to heat can be practiced. In this regard, substrates suitable for being coated by the coating composition of the present invention includes, for example, metal, thermoplastic, hardboard or fiberboard, and the like.

The following examples show how the present invention can be practiced but should not be construed as limiting. In this application, all units are in the metric system unless otherwise expressly indicated. Also, all references cited herein are expressly incorporated herein by reference.

EXAMPLE 1

The adduct was formed from para-hydroxybenzoic acid and Cardura E epoxy-ester (a glycidyl ester of Versatic 911 acid; Versatic 911 acid is a mixture of aliphatic, mostly tertiary, acids with 9-11 carbon atoms; Shell Chemical Company, New York, N.Y.). These ingredients (1:1 molar ratio) were heated in a reaction vessel to about 115° C. at which time an exothermic reaction increased the reaction temperature to 180° C. in about 2 minutes. The reaction mixture then cleared. Within one hour following the exotherm, the acid value of the reaction mixture dropped to 32. The reaction was maintained until the acid number of the resulting ester-alcohol adduct was less than 10.

EXAMPLE 2

In order to demonstrate the degradation of hydroxybenzoic acid when directly reacted with a polyol for formation of a polyester, one mole of glycerine was reacted with two moles of para-hydroxybenzoic acid. The reaction mixture was heated for a period of one week at gradually increasing temperatures ranging from 170° C. to 225° C. After seven days of reaction, the acid value of the reaction mixture had dropped to 52.2. The temperature of the reaction mixture then was raised gradually to 235° C. in the presence of azeotroping solvents added to the reaction mixture; however, the reaction mass gelled.

These results demonstrate that direct reaction of hydroxybenzoic acid with a polyol for synthesis of a polyester is impractical since degradation of the hydroxybenzoic acid is prevalent. Based upon the results reported in Example 1 and in the remaining examples, it is clear that formation of the epoxy-ester adduct does permit the hydroxybenzoic acid to be incorporated successfully into a polyester.

EXAMPLE 3

Two different reaction schemes were developed for the reaction of the epoxide with the hydroxybenzoic acid for formation of the ester-alcohol adduct, depending on whether the epoxide was a liquid or a gas at the reaction temperature (ca. 160° C.) Both methods result in the substantially complete conversion of the hydroxybenzoic acid into the desired ester-alcohol adduct which is formed prior to addition of other ingredients for forming a polyester.

The reaction scheme for formation of the adduct from an epoxide which is liquid at reaction temperatures can be illustrated by the following reaction. Two moles of salicylic acid were reacted with two moles of Cardura E epoxide according to the reaction scheme set forth in Example 1. The resulting adduct then was reacted with maleic anhydride at 210° C. reaction temperature to produce a difunctional polyester containing unsaturation in the backbone. This polyester was a moderate viscosity material at room temperature with a hydroxyl number of 146 and an acid value of 7.

The reaction scheme for formation of the adduct from an epoxide which is a gas at reaction temperature can be illustrated by the following reaction. Two moles of salicylic acid were reacted with two moles of propylene oxide by first melting the salicyclic acid in a reaction vessel and maintaining the molten acid at its melting point of about 160°-165° C. The propylene oxide then was added to the molten acid dropwise. Unreacted vaporized propylene oxide was returned to he reaction vessel by use of a reflux condenser which was attached to such vessel. When the acid value of the reaction mixture was determined to be less than 5, the reaction vessel was cooled and one mole of maleic anhydride added thereto. After flushing the headspace of the reaction vessel with nitrogen gas, the reaction vessel was heated to 210° C. and held at this temperature until the acid value of the resulting resin was determined to be under 10. The resulting resin was vacuum stripped and cooled to room temperature. This polyester was determined to have a hydroxyl number of 168 and an acid value of 5.6.

In neither of the adduct formation reactions detailed above nor in the subsequent polyester formation therefrom was any degradation of the hydroxybenzoic acid apparent. Again, the novelty of the adduct and its use in formation of polyol-polyesters is demonstrated.

EXAMPLE 4

Several polyol (polyester) polymers were prepared from the ester-alcohol adduct of this invention. The adduct was formed according to one of the reaction schemes set forth in Example 3.

| POLYOL 3511-160 | |
|---|---|
| Reactant | Mole Ratio |
| p-Hydroxybenzoic Acid | 2.0 |
| Cardura E epoxy | 2.0 |
| Neopentyl Glycol | 2.0 |
| Adipic Acid | 2.0 |
| Isophthalic Acid | 1.0 |

Hydroxyl Value = 80
Acid Value = 4.5
(80% by weight of the polyol in Cellosolve acetate solvent)

| POLYOL 3511-181B | |
|---|---|
| Reactant* | Mole Ratio |
| Salicylic Acid | 2.0 |
| Cardura E ester | 1.0 |
| Propylene Oxide | 1.0 |
| Adipic Acid | 2.0 |
| Neopentyl Glycol | 2.0 |
| Isophthalic Acid | 1.0 |

Hydroxy Value = 83
(no solvent)
Acid Value = 9.5
*The salicylic acid-propylene oxide adduct (preformed at a 1:1 molar ratio) was charged to the reaction followed by the salicylic acid-Cardura E epoxy adduct (preformed at a 1:1 molar ratio) and the other reactants.

| POLYOL 3511-183 | |
|---|---|
| Reactant* | Mole Ratio |
| Salicylic Acid | 2.0 |
| Propylene Oxide | 1.0 |
| Cardura E ester | 1.0 |
| Adipic Acid | 2.0 |
| Neopentyl Glycol | 1.0 |
| Isophthalic Acid | 1.0 |
| 3,4-bis(p-hydroxyphenyl)-3,4-hexanediol | 1.0 |

Hydroxy Value = 110
Acid Value = 27.2
(no solvent)
*Prepared in the manner of Polyol 3511-181B.

-continued

| | Viscosity (cps) | | | Cure Time | Sward Hardness[1] | | MEK Rub[2] | |
|---|---|---|---|---|---|---|---|---|
| Coating | Initial | 4 hr. | 24 hr. | (sec) | RT[3] | HT[4] | RT | HT |
| 3511-160 | 119 | 150 12 | 190 | 90 | 34 | 36 | 27 | 73 |
| 3511-181B | 220 | 271.5 | 450 | 120+ | 22 | 10 | 10 | 7 |
| 3511-183 | 148 | — | 197.5 | 120+ | 38 | 46 | 13 | 23 |

[1] Plate glass is defined as 100 for Sward Hardness.
[2] Methyl ethyl ketone (MEK) wetted rag rubbed over one area of cured film with moderate thumb pressure until glass substrate is visible.
[3] RT is room temperature.
[4] HT: Samples held at 160° C. for 5 minutes after vaporous amine catalyst exposure, then allowed to cool for 3 days at room temperature prior to testing.

POLYOL 3895-27

| Reactant | Mole Ratio |
|---|---|
| Salicylic Acid | 2.0 |
| Propylene Oxide | 2.0 |
| Fumaric Acid | 1.0 |

Hydroxy Value = 187
Acid Value = 17
(no solvent)

POLYOL 3895-29

| Reactant | Mole Ratio |
|---|---|
| Salicyclic Acid | 2.0 |
| Ethylene Oxide | 2.0 |
| Fumaric Acid | 1.0 |

Hydroxyl Value = 147
Acid Value = 18.1
(no solvent)

POLYOL 3895-59

| Reactant | Mole Ratio |
|---|---|
| Salicylic Acid | 2.0 |
| Cardura E ester | 2.0 |
| Fumaric Acid | 1.0 |
| Propylene Glycol | 6.1 |
| Adipic Acid | 6.0 |

Hydroxy Value = 41.4
Acid Value = 10.96
(no solvent)

In none of the above reactions was any degradation of the hydroxybenzoic acid evident.

EXAMPLE 5

Three of the polyols of Example 4 were compounded into coatings formulations in order to establish vaporous tertiary amine catalyzed curability of such polyols. The formulations are given below:

| | COATING (gms) | | |
|---|---|---|---|
| Ingredient | 3511-160 | 3511-181B | 3511-182[3] |
| Polyol | 70.1 | 61.0 | 51.0 |
| Curing Agent[1] | 40.2 | 40.2 | 40.2 |
| Cellosolve Acetate[2] | 45.0 | 30.0 | 35.0 |

[1] Mixture of Mondur HC isocyanate and Desmodur L-2291A isocyanate (160:26 parts by weight ratio respectively); Mondur HC isocyanate is the tetrafunctional reaction product of hexamethylene diisocyanate and toluene diisocyanate (11.5% NCO content, equivalent weight of 365, 60% solids in Cellosolve acetate/xylene), Mobay Chemical Company, Pittsburgh, Pa. Desmodur L-2291A isocyanate is an aliphatic polyfunctional isocyanate of the hexamethylene diisocyanate biuret type, Mobay Chemical Company, Pittsburgh, Pa.
[2] Cellosolve acetate (urethane grade) is ethylene glycol monoethyl ether acetate, Union Carbide Corporation, New York, New York.
[3] Polyol 3511-183 was cut to 90% by weight in Cellosolve acetate before incorporation in the coating.

The coating compositions were coated on glass plates with a Meyer bar to give a 0.1-0.5 mil dry film and cured by exposure to vaporous triethylamine catalyst carried by $N_2$ or $CO_2$ carrier gas (about 7% catalyst by volume) in a gas curing chamber. Viscosity measurements of the coating compositions were recorded as well as results of survey performance tests.

Several observations can be made from the above-tabulated data. The stability of the coating compositions is established by the viscosity measurements reported. Several factors impact the marginal performance of the coating samples. First, the polymers were synthesized in a survey test evaluation program intended to establish operability of the vapor cure systems and to establish further fruitful areas of research. No optimization of polymer design, curing agent design, or the like was attempted. Second, an apparent likely explanation (one of several explanations possible) as to the low performance results resides in use of a di-functional polymer for cross-linking. Increasing the number of cross-linking sites on the polymer should improve the performance of the coating compositions.

Still, these results establish the usefulness of the adduct formation of the present invention.

I claim:

1. A method for making a phenol-functional polyester which comprises:
    (a) reacting a hydroxybenzoic acid with an epoxy-functional compound to form an ester-alcohol adduct; and
    (b) reacting said adduct with additional polyester-forming ingredients under polyesterification conditions to make said phenol-functional polyester.

2. The method of claim 1 wherein said additional polyester-forming ingredients comprise a polyol and a polycarboxylic acid.

3. The method of claim 2 wherein said polyol is a glycol and said polycarboxylic acid is a dibasic acid.

4. The method of claim 1 wherein said adduct and polyester-forming ingredients are in a molar ratio for said polyester to have at least two reactive phenol groups.

5. The method of claim 1 wherein said epoxy-functional compound is an epoxy-functional monomer, oligomer, or polymer.

6. The method of claim 5 wherein the molar ratio of carboxyl groups of said hydroxybenzoic acid to epoxy groups of said epoxy-functional compound is about 1:1.

7. The method of claim 1 wherein the resulting polyester is substantially free of reactive aliphatic hydroxyl groups.

8. In a method for making a coating composition rapidly curable in the presence of a vaporous tertiary amine, said coating composition comprising a phenol-functional polyester polymer and a multi-isocyanate curing agent, the improvement for synthesizing said polymer which comprises:
    (a) reacting a hydroxybenzoic acid with an epoxy-functional compound to form an ester-alcohol adduct; and (b) reacting said adduct with a additional polyester-forming ingredients under polyesterification conditions to make said phenol-functional polyester polymer.

9. The method of claim 8 wherein the molar ratio of the ingredients for said polyester polymer are such that said polyester polymer contains substantially no aliphatic hydroxyl groups.

10. The method of claim 8 or 9 wherein said epoxy-functional compound is mono-epoxy-functional.

11. The method of claim 10 wherein said epoxy group of said epoxy-functional compound is a terminal epoxy group.

12. The method of claim 8 wherein said hydroxybenzoic acid contains ring substitution.

13. The method of claim 8 wherein said epoxy-functional compound is a polymethylene oxide.

14. The method of claim 8 wherein said epoxy-functional compound is a glycidyl-functional acrylic copolymer.

15. The method of claim 8 wherein said hydroxybenzoic acid is selected from para-hydroxybenzoic acid, meta-hydroxybenzoic acid, ortho-hydroxybenzoic acid, and mixtures thereof.

16. The method of claim 8 wherein said ester-alcohol adduct is formed at a reaction temperature of up to about 175° C.

17. The method of claim 8 wherein said ester-alcohol adduct formation is conducted in an inert solvent.

18. The method of claim 8 wherein the molar ratio of said hydroxybenzoic acid to said epoxy functional compound is about 1:1.

19. The method of claim 8 wherein said additional polyester-forming ingredients comprise a polyol and a polycarboxylic acid.

* * * * *